United States Patent
Forte-McRobbie et al.

(10) Patent No.: US 7,428,234 B2
(45) Date of Patent: Sep. 23, 2008

(54) VOICE-OVER-IP HYBRID DIGITAL LOOP CARRIER

(75) Inventors: James R. Forte-McRobbie, Somerset, NJ (US); Irwin Gerszberg, Kendall Park, NJ (US)

(73) Assignee: AT&T Intellectual Property II, L.P., Bedminster, NJ (US)

( * ) Notice: Subject to any disclaimer, the term of this patent is extended or adjusted under 35 U.S.C. 154(b) by 867 days.

(21) Appl. No.: 10/737,289

(22) Filed: Dec. 16, 2003

(65) Prior Publication Data
US 2005/0021798 A1    Jan. 27, 2005

Related U.S. Application Data

(60) Provisional application No. 60/466,087, filed on Apr. 28, 2003.

(51) Int. Cl.
*H04L 12/66* (2006.01)
(52) U.S. Cl. .................... 370/352; 370/355
(58) Field of Classification Search ............ None
See application file for complete search history.

(56) References Cited

U.S. PATENT DOCUMENTS

| | | | |
|---|---|---|---|
| 6,252,952 B1 * | 6/2001 | Kung et al. ............ 379/114.1 |
| 6,278,707 B1 | 8/2001 | MacMillan | |
| 6,324,279 B1 * | 11/2001 | Kalmanek et al. ......... 379/229 |
| 6,487,196 B1 * | 11/2002 | Verthein et al. ............ 370/352 |
| 6,498,791 B2 | 12/2002 | Pickett | |
| 6,584,490 B1 | 6/2003 | Schuster | |
| 6,614,781 B1 | 9/2003 | Elliott | |
| 6,647,109 B1 | 11/2003 | Henderson | |
| 6,697,475 B1 * | 2/2004 | MeLampy et al. ...... 379/201.12 |
| 2001/0032270 A1 * | 10/2001 | Koo ......................... 709/237 |
| 2004/0095925 A1 * | 5/2004 | Cody et al. ................ 370/352 |

FOREIGN PATENT DOCUMENTS

EP     1096808     5/2001

* cited by examiner

*Primary Examiner*—Ramnandan Singh
(74) *Attorney, Agent, or Firm*—Michael Haynes PLC; Michael Haynes; Dale R. Jensen

(57) ABSTRACT

Certain exemplary embodiments can comprise a method of use comprising: for a call between a local IP network and a remote non-IP network, converting between IP packets and PCM robbed bit signaling via a VoIP channelized router; providing the PCM robbed bit signaling to a TDM switch via the VoIP channelized router; and/or converting between IP packets and GR303 call reference values via the VoIP channelized router.

20 Claims, 3 Drawing Sheets

2000

| Via converting between IP packets and PCM robbed bit signaling by a VoIP channelized router, providing information related to an off-hook condition on a phone on a local IP network to a TDM switch | 2100 |

| Via converting between PCM robbed bit signaling and IP packets by the VoIP channelized router, providing a dial tone from the TDM switch to the phone on the local IP network | 2200 |

| Via converting between IP packets and PCM robbed bit signaling by the VoIP channelized router, providing a called number to the TDM switch | 2300 |

| Via converting between PCM robbed bit signaling and IP packets by the VoIP channelized router, providing a signal indicative of ringing to the phone on the local IP network from the TDM switch | 2400 |

| Via converting between PCM signaling and IP packets by the VoIP channelized router, providing voice communications between the phone on the local IP network and a phone on a remote non-IP network | 2500 |

Fig. 2

ABID US 7,428,234 B2

VOICE-OVER-IP HYBRID DIGITAL LOOP CARRIER

CROSS-REFERENCES TO RELATED APPLICATIONS

This application claims priority to, and incorporates by reference herein in its entirety pending United States Provisional Patent Application Ser. No. 60/466,087, filed Apr. 28, 2003.

BACKGROUND

U.S. Pat. No. 6,584,490 (Schuster), which is incorporated by reference herein in its entirety, allegedly cites that a "system and method for providing call handling services on a data network telephony system. A portable information device, such as a PDA, associated with a user contains the user's address and/or appointment book information. The address and/or appointment book information includes priority information comprising one or more address/appointment entries having associated priority levels. The priority information is transmitted from the portable information device across a link to a data network telephone or other voice communication device, where it is stored in a call handling database. When an incoming call request is received at the data network telephone, the call is handled according to the priority information contained in the call handling database". See Abstract.

U.S. Pat. No. 6,278,707 (MacMillan), which is incorporated by reference herein in its entirety, allegedly cites that a "communication system includes an interface between two networks, for example the public telephone system and an IP-based network. The system includes a modem bank which receives bearer channel inputs and provides outputs to the second network. A protocol converter interfaces with a signaling network such as a common channel signaling (CCS) network (e.g., an Signaling System 7 network). The protocol converter communicates signaling information to the modem bank. A resource manager is coupled to the protocol converter and includes a memory which stores status information relating to the system". See Abstract.

U.S. Pat. No. 6,498,791 (Pickett), which is incorporated by reference herein in its entirety, allegedly cites that systems "and methods by which voice/data communications may occur in multiple modes/protocols are disclosed. In particular, systems and methods are provided for multiple native mode/protocol voice and data transmissions and receptions with a computing system having a multi-bus structure, including, for example, a TDM bus and a packet bus, and multi-protocol framing engines. Such systems preferably include subsystem functions such as PBX, voice mail and other telephony functions, LAN hub and data router. In preferred embodiments, a TDM bus and a packet bus are intelligently bridged and managed, thereby enabling such multiple mode/protocol voice and data transmissions to be intelligently managed and controlled with a single, integrated system. A computer or other processor includes a local area network controller, which provides routing and hub(s) for one or more packet networks. The computer also is coupled to a buffer/framer, which serves to frame/deframe data to/from the computer from TDM bus. The buffer/framer includes a plurality of framer/deframer engines, supporting, for example, ATM and HDLC framing/deframing. The buffer/framer is coupled to the TDM bus by way of a switch/multiplexer, which includes the capability to intelligently map data traffic between the buffer/framer and the TDM bus to various slots of the TDM frames. Preferably, a DSP pool is coupled to buffer/framer in a manner to provide various signal processing and telecommunications support, such as dial tone generation, DTMF detection and the like. The TDM bus is coupled to a various line/station cards, serving to interface the TDM bus with telephone, facsimiles and other telecommunication devices, and also with a various digital and/or analog WAN network services". See Abstract.

U.S. Pat. No. 6,614,781 (Elliott), which is incorporated by reference herein in its entirety, allegedly cites that the "present invention describes a system and method for communicating voice and data over a packet-switched network that is adapted to coexist and communicate with a legacy PSTN. The system permits packet switching of voice calls and data calls through a data network from and to any of a LEC, a customer facility or a direct IP connection on the data network. The system includes soft switch sites, gateway sites, a data network, a provisioning component, a network event component and a network management component. The system interfaces with customer facilities (e.g., a PBX), carrier facilities (e.g., a LEC) and legacy signaling networks (e.g., SS7) to handle calls between any combination of on-network and off-network callers. The soft switch sites provide the core call processing for the voice network architecture. The soft switch sites manage the gateway sites in a preferred embodiment, using a protocol such as the Internet Protocol Device Control (IPDC) protocol to request the set-up and tear-down of calls. The gateway sites originate and terminate calls between calling parties and called parties through the data network. The gateway sites include network access devices to provide access to network resources. The data network connects one or more of the soft switch sites to one or more of the gateway sites. The provisioning and network event component collects call events recorded at the soft switch sites. The network management component includes a network operations center (NOC) for centralized network management". See Abstract.

U.S. Pat. No. 6,647,109 (Henderson), which is incorporated by reference herein in its entirety, allegedly cites that a "telephony system and method for providing telephony services to remote users. The telephony system comprises a user side and a provider side. The user side includes a telephony instrument and a personal computer for establishing communication with the provider side via a communication gateway, a communication device and a wide area network, such as the Internet. The provider side includes a virtual private network in communication with the wide area network and a communication network. The communication network is in communication with a telephony server interfacing with a telephone switched system. The telephone switched network provides telephone lines for allocation of the telephone lines by the virtual private network to the remote users". See Abstract.

SUMMARY

Certain exemplary embodiments can comprise a method of use comprising: for a call between a local IP network and a remote non-IP network, converting between IP packets and PCM robbed bit signaling via a VoIP channelized router; providing the PCM robbed bit signaling to a TDM switch via the VoIP channelized router; and/or converting between IP packets and GR303 call reference values via the VoIP channelized router.

BRIEF DESCRIPTION OF THE DRAWINGS

A wide variety of potential embodiments will be more readily understood through the following detailed description, with reference to the accompanying drawings in which:

FIG. 2 is a flow diagram of an exemplary embodiment of a method of use 2000.

DEFINITIONS

Figure 1:
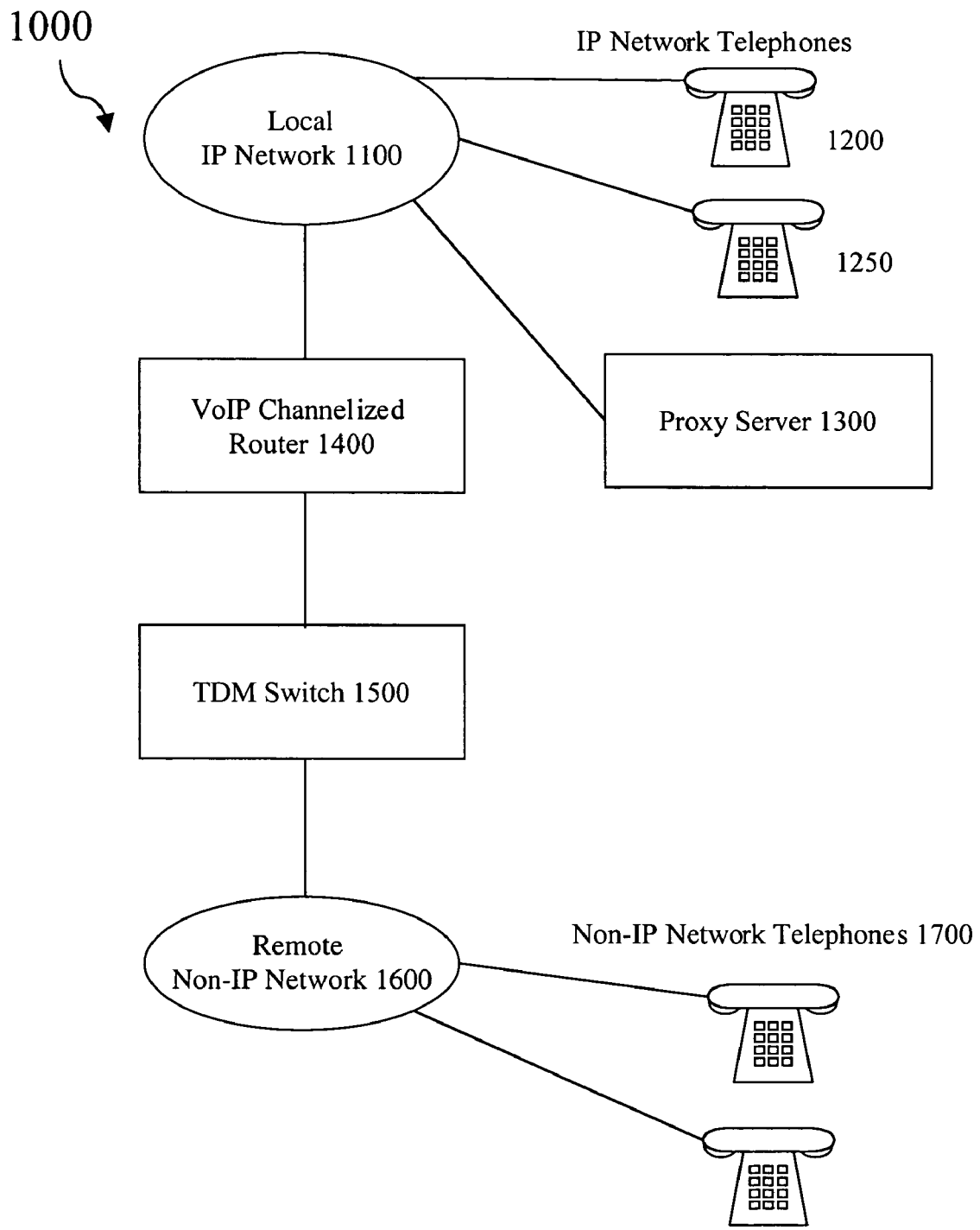
FIG. 1 is a block diagram of an exemplary embodiment of a system 1000.

When the following terms are used herein, the accompanying definitions apply:

486 Busy here—an IP signal indicative a busy telephone or faulty circuit.

8 bit TDM data sequence—a data format used in TDM circuits.

A and B bits—bits used in digital environments to convey signaling information. A bit value of one generally corresponds to loop current flowing in an analog environment. A bit zero corresponds to no loop current. Other signals are made by changing bit values; for example a switch-hook is set by briefly setting the A bit to zero.

A/B bit toggle—a TDM signal indicative of a call being answered.

ACK message—a message transmitted by the receiver of data to acknowledge that a signal, information, or packet has been received from the sender.

B bit toggle—a signal in a PCM circuit indicative of an off hook condition.

BYE message—a message transmitted by a sender indicating that a communication has been terminated.

call reference values—a number carried in all Q.931 messages, providing a local identifier for a given ISDN call.

call—an attempted telephonic communication.

delta channel (D-Channel)—the channel in an ISDN connection that carries control and signaling information.

digital loop carrier (DLC)—a technology that makes use of digital techniques to bring a wide range of services to telecommunications users via twisted-pair copper telephone lines.

Digital signal X (DS0, DS1, etc.)—a term for the series of standard digital transmission rates or levels based on DS0, a transmission rate of 64 Kbps, the bandwidth normally used for one telephone voice channel. DS0 is the base for the digital signal X series. DS1, used as the signal in the T-1 carrier, is 24 DS0 (64 Kbps) signals transmitted using pulse-code modulation (PCM) and time-division multiplexing (TDM). DS2 is four DS1 signals multiplexed together to produce a rate of 6.312 Mbps. DS3, the signal in the T-3 carrier, carries a multiple of 28 DS1 signals or 672 DS0s or 44.736 Mbps.

GR303—a set of generic technical specifications for digital loop carrier (DLC) systems.

hub—a point on a network where circuits are connected.

information device—any device on which resides a finite state machine capable of implementing at least a portion of a method, structure, and/or or graphical user interface described herein. An information device can include well-known components such as one or more network interfaces, one or more processors, one or more memories containing instructions, and/or one or more input/output (I/O) devices. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), mobile terminal, Bluetooth device, communicator, "smart" phone (such as a Handspring Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

integrated services digital network (ISDN)—an international communications standard for sending voice, video, and data over digital telephone lines or normal telephone wires. ISDN supports data transfer rates of 64 Kbps (64,000 bits per second).

interface—(n.) a boundary across which two independent systems meet and act on or communicate with each other. (v.) to connect with or interact with by means of an interface.

invite 200 message—an IP signal indicative of a call being answered.

invite F8 180 signal—an IP signal indicative a ringing telephone.

IP (Internet protocol)—a network protocol that defines how packets are addressed and routed.

IP network—a network using IP.

IP packet-to-bit conversion—a conversion of IP packets to a data form transmittable by a TDM circuit.

IP telephone—a device enabling voice conversations across an IP network. The device can conform to the SIP, H.323, and/or MGCP/MEGACO protocols.

local—pertaining to a system or device that resides within a subject switching domain.

local area network (LAN)—a local data communications network used to link computers and/or peripheral devices under some form of standard control.

local digital switch—a device on a local network in which binary encoded information is routed between an input and an output port by means of time division multiplexing rather than by a dedicated circuit.

local IP proxy server—a server on a local network that sits between a client application, such as a Web browser, and a real server. It intercepts all requests to the real server to see if it can fulfill the requests itself. If not, it forwards the request to the real server.

loop start signaling—seizing a telephone line by giving it a supervisory signal such as, for example, a signal related to taking a telephone of the hook.

M24—a T-1 service that allows multiplexing of up to 24 voice or data channels into a single T-1 link.

MGCP/MEGACO (Media Gateway Control Protocol/MEdia GAteway COntroller)—an IP telephony signaling protocol from the IETF. MGCP was the original protocol, which evolved into MEGACO. Both protocols are designed for implementation in IP phones that are lower cost than SIP or H.323 phones. MGCP/MEGACO requires the use of softswitches for call control and more resembles the telephony model of the circuit-switched PSTN than do SIP and H.323. The softswitch is aware of the entire call throughout its duration (it manages state) and enables operator intervention like the PSTN. MCGP/MEGACO is a combination of the SGCP and IPCD protocols, and many devices that implement MGCP/MEGACO also support SIP and/or H.323.

network—two or more information devices that are linked to share resources (such as printers or CD-ROMs), exchange files, and/or allow electronic communications therebetween. Information devices on a network can be linked through various wireline or wireless media, such as cables, telephone lines, power lines, optical fibers, radio waves, free space optics, etc.

non-IP—any protocol for addressing and routing other than IP.

packet—a portion of a digital message.

phone—see telephone.

plain old telephone service (POTS)—A basic service supplying standard single line telephones using loop start signaling.

private branch exchange (PBX)—a telephone system within an enterprise that switches calls between enterprise users on local lines while allowing all users to share a certain number of external telephone lines.

proxy server—software running on an information device that relays packets (e.g. from one local IP phone to another local IP phone).

publicly switched telephone network (PSTN)—the interconnected system of telephone switches and lines used for telecommunication services.

pulse code modulation (PCM)—a method of compressing and/or modulating a set of digital samples, and can includes the μ-law and A-law approaches.

Q.931—a message-oriented signaling protocol in an ISDN D-Channel.

remote—pertaining to a system or device that is extrinsic to a subject switching domain.

robbed bit signaling—signaling via the use of A and B bits, which can be buried in voice data.

routing—the act of selecting a network path for a message.

router—an interface between an IP network and a PSTN cloud.

session initiation protocol (SIP)—a telecommunications signaling protocol for an IP network.

T-1—a digital transmission link with a total signaling speed of 1.544 Mbps.

TDM (time division multiplexing)—a technique for transmitting a number of separate data, voice, and/or video signals essentially simultaneously over one communications medium by interleaving pieces of each signal one after another in time.

telephone—an instrument that converts voice and other sound signals into a form that can be transmitted to remote locations and that receives and reconverts information from a transmittable form into voice and other sound signals.

voice over Internet protocol (VoIP)—a technology used to transmit voice conversations over a data network using IP. Such data network may be the Internet or an intranet.

VoIP channelized router—a device adaptable to provide protocol conversion for calls to non-IP networks and routing for calls within an IP network.

DETAILED DESCRIPTION

FIG. 1 is a block diagram of an exemplary embodiment of a system 1000. System 1000 can comprise a local IP network 1100. Local IP network 1100 can comprise IP network telephones 1200. IP network telephones 1200 can comprise SIP, MGCP/MEGACO, and/or H323 telephones, etc.

In certain exemplary embodiments, a VoIP channelized router 1400 can be coupled to local IP network 1100. VoIP channelized router 1400 can communicatively couple one or more IP network telephones 1200 to one or more other IP network telephones 1250 on local IP network 1100. VoIP channelized router 1400 can be adaptable to communicatively couple one or more IP network telephones 1200 to one or more non-IP network telephones 1700. VoIP channelized router 1400 can be adaptable to communicatively couple IP network telephones 1200 to non-IP network telephones 1700 using existing DS0 and DS1 lines. VoIP channelized router 1400 can convert IP packets to PCM robbed bit signaling and/or GR303 Call Reference Values (CRV). The use of GR303 standards can be extended to local IP network 1100. IP voice traffic can be converted to a current circuit switched format via VoIP channelized router 1400.

Likewise, voice traffic in a circuit switched format can be converted to an IP format by VoIP channelized router 1400.

VoIP channelized router 1400 can terminate an IP packet, call to a DS0 assignment. A DS0 control signal can be mapped to a GR303 call Reference Value that is provisioned from TDM switch 1300. VoIP channelized router 1400 can convert IP voice packets to an M24 format. IP voice traffic can be terminated at VoIP channelized router 1400 and converted to a 64 kb/s serial data stream. Off hook call supervision can be detected via VoIP channelized router 1400. Local IP network 1100 can comprise a proxy server 1300. Proxy server 1300 can be adaptable to control calls between two or more IP network telephones 1200.

Remote non-IP network 1600 can be, for example, a circuit switched voice network, a POTS network, a CENTREX network, and/or a GR303 network, etc.

Remote non-IP network 1600 can be communicatively coupled to one or more non-IP telephones 1700. Non-IP telephones 1700 can be adaptable for use in calling one or more of a plurality of non-IP network telephones 1700 and/or one or more of a plurality of IP network telephones 1200.

Remote non-IP network 1600 can be couplable to a TDM switch 1500. TDM switch 1500 can be adaptable to relay control signals for a call between IP network telephones 1200 and non-IP network telephones 1700. TDM switch 1500 can be coupled to VoIP channelized router 1400.

VoIP channelized router 1400 can comprise a static router card. The static router card can terminate IP voice traffic and convert IP voice traffic to a 64 kb/s serial data stream. VoIP channelized router 1400 can comprise a call control card. The call control card can detect off hook call supervision. VoIP channelized router 1400 can comprise a PCM encoder card. The PCM encoder card can convert IP packets to a PCM voice signal. VoIP channelized router 1400 can comprise a DS1 card. The PCM voice signal can be routed to the DS1 card where a DS0 time slot can transport the signal to a Generic GR303 hub.

VoIP channelized router 1400 can comprise an IP/CRV channel unit function that converts IP voice packets to GR303 Call reference Values (CRV). Converting IP voice packets to GR303 CRVs can enhance existing Digital Loop Carrier technology by converting IP voice traffic to a current circuit switched format.

VoIP channelized router 1400 can comprise a new type of DS1 channelized IP router. VoIP channelized router 1400 can terminate an IP packet call to a DS0 assignment. The DS0 can then be transported via a DS1 facility to a commercially available GR303 Hub. The DS0 can be mapped to a GR303 CRV that is provisioned from the 5ESS or DMS 500 switch.

Certain exemplary embodiments can solve the problem of integrating tradition business line delivery and local PBX call routing options. By adding local station calling features to the Hybrid Digital loop Carrier can enjoy the benefits of PBX station to station routing plus full Centrex class features from a local digital switch. An integrated VoIP encoder has been proposed to be integrated into a traditional Digital loop carrier system (i.e. SLC5 type product). Certain embodiments can integrate current TDM and emerging IP enterprise voice networks.

Certain exemplary embodiments can provide a foundation for 15 kHz/HIGH FIDELITY Switched Voice services. Certain embodiments can incorporate concepts from the VoIP Hybrid GR303 and M24 15 kHz audio program cards, which can be combined to produce a 384 kb/s IP voice service. The GR303 switch interface standard specified by Telcordia can be enhanced and a new standard can be created to support wide bandwidth/high fidelity voice switching. Certain embodiments can adapt high fidelity audio encoding technique used to transport audio signals for FM radio stations over ACCUNET 1.5 service. The M24 audio program card (installed in the WESTERN ELECTRIC D4) can encode analog audio signals into 384 kb/s bit streams and/or can utilize 6 time slots on the ATT Accunet DS1 digital transport service. This can result in a 15 kHz audio bandwidth instead of 4 kHz as in a traditional 64 kb/s DS0 channel. This increase in bandwidth allocation can provide a high fidelity source of encoded audio/voice to be packetized and transported via IP networks. The IP voice packet can be routed to the Hybrid IP Digital Loop Carrier system and converted to a multiple DS0 digital (384 kb/s) signal that is switched similar to a 128/kb/s ISDN data call.

Certain exemplary embodiments can convert an IP generated telephone call to conventional CENTREX telephone services. This can provide a smooth transition from enterprise voice networks to carrier class voice networks. Certain embodiments of a new type of channel banks can enable IP voice packets to be routed via a unique backplane resembling an IP LAN segment and be can converted to M24 format. The channel bank backplane can serve as a communications bus for various server functions built on circuit cards. Of the many functions, IP voice traffic could then be routed from incoming IP packet networks to a circuit switched voice network.

FIG. 2 is a flow diagram of one of many exemplary embodiments of a method of use 2000. At activity 2100, via converting between IP packets and PCM robbed bit signaling by a VoIP channelized router, providing information related to an off-hook condition on a phone on a local IP network to a TDM switch. Providing information related to the off-hook condition can comprise: taking the phone on the local IP network off its hook wherein an invite F1 message is created by the phone on the local IP network; detecting an off hook condition of the phone on the local IP network; routing the invite F1 message to a local IP proxy server; routing the invite F1 message from the local IP network to a VoIP channelized router; receiving the invite F1 message at the VoIP channelized router; and/or sending a "trying 100" message from the local proxy server to the phone on the local IP network.

At activity 2200, via converting between PCM robbed bit signaling and IP packets by the VoIP channelized router, providing a dial tone from the TDM switch to the phone on the local IP network. Providing a dial tone can comprise: a calling party initiating a telephone call using the IP telephone on the local IP network; receiving a dial tone via a 183 message at the IP telephone and/or the local IP network; and/or converting the invite message at the channelized router to a B bit toggle conforming to PCM signaling and forwarding the toggle to a TDM switch.

At activity 2300, via converting between IP packets and PCM robbed bit signaling by the VoIP channelized router, providing a called number to the TDM switch. Providing the called telephone number can comprise: entering the telephone number of the party to be called at the IP phone; receiving the telephone number from the local IP network at the channelized router; converting the called party telephone number to PCM robbed bit signaling at the channelized router; and/or providing the called telephone number to the TDM switch.

A telephone on a remote non-IP network can initiate the call. The incoming call from the remote non-IP network can be received via a channelized router channel as PCM robbed bit signaling. The channelized router can convert robbed bit signaling to an invite 100 message.

At activity 2400, via converting between PCM robbed bit signaling and IP packets by the VoIP channelized router, providing a signal indicative of ringing to the phone on the local IP network from the TDM switch. Providing the signal indicative of ringing can comprise: attempting to signal the called party; sending a signal indicative of ringing from the TDM switch to the local IP network; receiving a signal indicative of ringing from the TDM switch at the channelized router; returning a reorder/busy tone to the local IP network and/or the IP telephone as a 486 Busy here message if the called party's line is "busy" or out of order; converting the ringing signal to an invite F8 180 signal at the channelized router; converting the ringing signal to an invite F8 180 signal via the local proxy server on the local IP network; providing the F8 180 signal to the local IP network; communicating the ringing signal to the telephone of the called party; and/or communicating the ringing signal to the telephone of the calling party. In certain exemplary embodiments, for an incoming call, if the IP telephone is busy or out of service, a 486 or 503 message can be returned to the channelized router converted to an appropriate TDM signal (e.g., via PCM robbed bit signaling), provided via the TDM switch to the remote non-IP network for call treatment.

At activity 2500, via converting between PCM signals (e.g., μ-law or A-law, etc.) and IP packets by the VoIP channelized router, providing voice communications between the phone on the local IP network and a phone on a remote non-IP network. In certain exemplary embodiments, the communicative coupling can comprise: a user answering the called telephone, sending A/B bit toggles for the telephone call from the TDM switch to the channelized router; receiving the A/B bit toggle from the TDM switch at the VoIP channelized router; converting the A/B bit toggles to an invite 200 message at the VoIP channelized router;

providing the invite 200 message to the local IP network; returning the invite 200 message to the calling IP telephone; and/or establishing the call with an ACK message from the channelized router to the IP telephone. In certain exemplary embodiments, for calls originating from phones on non-IP networks, if a given call is answered at a phone on the local IP network, then a 200 OK message can be sent back to the channelized router, converted to an appropriate TDM signal, and forwarded to signal a communicative coupling to the non-IP network. In certain exemplary embodiments, an ACK message can be returned to the IP telephone.

The VoIP channelized router can receive voice packets from the IP network. The voice packets can be sent from the IP telephone to the channelized router and converted from IP packets via bit conversion to a TDM data sequence for the TDM equipment (e.g., TDM hub, local switch, called party phone, etc.). The channelized router can provide a TDM data sequence to the remote IP-network. The VoIP channelized router can receive a TDM data sequence from the non-IP network. The VoIP channelized router can convert TDM data sequences to IP packets, and provide the IP packets to the local IP-network.

In certain exemplary embodiments, a call can be terminated via a BYE message sent from the phone on the local IP network to the channelized router. When either end terminates the call, switch disconnect and REL/BYE messages can be sent to the channelized router and the TDM switch.

Figure 3:
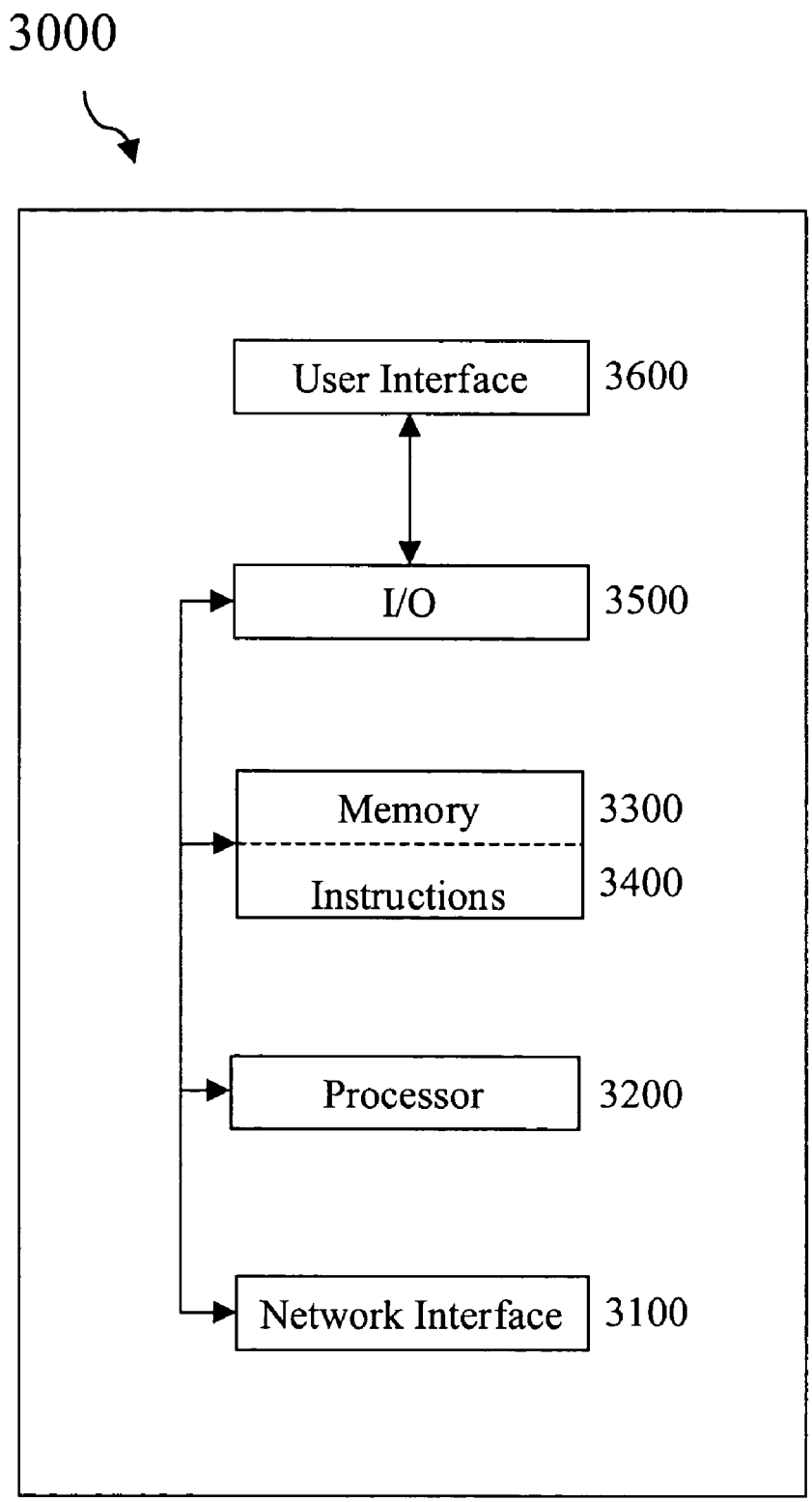
FIG. 3 is a block diagram of an exemplary embodiment of an information device 3000.

FIG. 3 is a block diagram of an exemplary embodiment of an information device 2000, which in certain operative embodiments can comprise, for example, proxy server 1800 of FIG. 1. Information device 3000 can comprise any of numerous well-known components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary.

Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. A method, comprising:
for a call between a local Internet Protocol (IP) network and a remote non-IP network, converting IP packets to Pulse-Code Modulation (PCM) robbed bit signaling via a Voice over Internet Protocol (VoIP) channelized router, the VoIP channelized router adapted to terminate an IP packet call to a Digital Signal 0 (DS0) assignment, the VoIP channelized router adapted to route the IP packet call to a Hybrid IP Digital Loop Carrier system, the IP packet call convened to a multiple DS0 digital signal,
providing the PCM robbed bit signaling to a Time-Division Multiplexing (TDM) switch.

2. The method of claim 1, further comprising:
converting between IP packets and GR303 call reference values via the VoIP channelized router, the VoIP channelized router adapted to map a DS0 control signal to a GR303 Call reference value that is provisioned from the TDM switch.

3. The method of claim 1, further comprising:
detecting an off-hook condition of a telephone on the local IP network.

4. The method of claim 1, further comprising:
receiving, at the VoIP channelized router, an invite message related to an off hook condition of an IP telephone.

5. The method of claim 1, further comprising:
providing a dial tone to a user of the local IP network.

6. The method of claim 1, further comprising:
converting an invite message, responsive to an off-hook condition, to a B bit toggle conforming to PCM signaling at the VoIP channelized router; and
forwarding the B bit toggle to the TDM switch.

7. The method of claim 1, further comprising:
receiving a called party telephone number from the local IP network.

8. The method of claim 1, further comprising:
converting a called party telephone number to PCM signaling, the VoIP channelized router adapted to receive a PCM voice signal at a DS1 card where a DS0 time slot transports the signal to a GR303 hub.

9. The method of claim 1, further comprising:
providing a called party telephone number to the TDM switch.

10. The method of claim 1, further comprising:
sending a signal indicative of ringing to the local IP network.

11. The method of claim 1, further comprising:
receiving a signal indicative of ringing from the TDM switch at the VoIP channelized router.

12. The method of claim 1, further comprising:
converting a signal indicative of ringing to an invite F8 180 signal at the VoIP channelized router; and
providing the F8 180 signal to the local IP network.

13. The method of claim 1, further comprising:
receiving an A/B bit toggle from the TDM switch at the VoIP channelized router, the toggle responsive to a signal that a called party has answered the call.

14. The method of claim 1, further comprising:
converting an A/B bit toggle to an invite 200 message;
providing the invite 200 message to the local IP network.

15. The method of claim 1, further comprising:
receiving voice packets from the local IP network at the VoIP channelized router, the VoIP channelized router adapted to convert the voice packets to an M24 format, the VoIP channelized router adapted to convert the voice packets to a 15 kHz audio bandwidth in a 64 kb/s serial data stream.

16. The method of claim 1, further comprising:
receiving a TDM data sequence from the remote non-IP network at the VoIP channelized router, the VoIP channelized router adapted to encode analog audio signals into 384 kb/s bit streams and utilize six time slots on a DS1 digital transport service.

17. The method of claim 1, further comprising:
converting voice packets to an 8 bit TDM data sequence via IP packet-to-bit conversion; and
providing the TDM data sequence to the remote non-IP network.

18. The method of claim 1, further comprising: converting an 8 bit TDM data sequence to voice packets, the VoIP channelized router adapted to encode frequency modulation radio station signals into a high fidelity audio that is transported over an ACCUNET 1.5 service; and
providing the voice packets to the local IP network.

19. A system comprising:
a local Voice over Internet Protocol (VoIP) channelized router, the VoIP channelized router adapted to terminate an Internet Protocol (IP) packet call to a Digital signal 0 (DS0) assignment, the VoIP channelized router adapted to route the IP packet call to a Hybrid IP Digital Loop Carrier system, the IP packet call converted to a multiple DS0 digital signal 1; and
means for communicatively coupling an IP network to a remote non-IP network using said channelized router.

20. A machine readable medium storing instructions for activities comprising:
routing a call from an Internet protocol (IP) network to a remote non-IP network via local Voice over Internet Protocol (VoIP) channelized router, the VoIP channelized router adapted to terminate an IP packet call to a Digital Signal 0 (DS0) assignment, the VoIP channelized router adapted to route the IP packet call to a Hybrid IP Digital Loop Carrier system, the IP packet call converted to a multiple DS0 digital signal.

* * * * *